United States Patent [19]

Weimer

[11] Patent Number: 4,708,860

[45] Date of Patent: Nov. 24, 1987

[54] SPLIT-FLOW REGENERATION IN ABSORPTIVE AIR SEPARATION

[75] Inventor: Robert F. Weimer, Allentown, Pa.

[73] Assignee: Air Products and Chemicals, Inc., Allentown, Pa.

[21] Appl. No.: 947,165

[22] Filed: Dec. 29, 1986

[51] Int. Cl.[4] .............................................. C01B 13/00
[52] U.S. Cl. ................................ 423/579; 423/210.5; 423/219
[58] Field of Search ...................... 423/210.5, 219, 579

[56] References Cited

U.S. PATENT DOCUMENTS

| 4,132,766 | 1/1979 | Erickson | 423/579 |
| 4,287,170 | 9/1981 | Erickson | 423/579 |
| 4,340,578 | 7/1982 | Erickson | 423/579 |
| 4,521,398 | 6/1985 | Erickson | 423/579 |
| 4,526,775 | 7/1985 | Cassano | 423/579 |
| 4,529,577 | 7/1985 | Chen et al. | 423/579 |
| 4,565,685 | 1/1986 | Cassano | 423/579 |

Primary Examiner—John Doll
Assistant Examiner—Wayne A. Langel
Attorney, Agent, or Firm—Geoffrey L. Chase; J. C. Simmons; W. F. Marsh

[57] ABSTRACT

A chemical absorptive separation of air in multiple stage of absorption and desorption is performed with partial recycle of absorbent between stages of desorption necessary to match equilibrium conditions in the various stages of absorption. This allows reduced absorbent flow, reduced energy demand and reduced capital costs.

10 Claims, 4 Drawing Figures

SPLIT-FLOW REGENERATION IN ABSORPTIVE AIR SEPARATION

The Government of the United States of America has rights in this invention pursuant to Contract Number DE-AC07-82CE40544 awarded by the U.S. Department of Energy.

TECHNICAL FIELD

The present invention is directed to absorptive separations of air to produce nitrogen and oxygen using an absorbent, which is continuously recycled and regenerated. More specifically, the present invention is directed to making commercially pure oxygen by absorptive separation using a molten salt bath of alkali metal nitrate and nitrite composition.

BACKGROUND OF THE PRIOR ART

The separation of air has long been practiced using absorption and cryogenic techniques. These techniques have been successful in recovering large percentages of the constituents of air, namely; nitrogen and oxygen. However, absorption and cryogenic techniques are highly energy intensive because of the requirements of high pressure and extremely low temperature, respectively.

It has been known to separate oxygen from nitrogen with various chemical media. Numerous chemical interactions of oxygen from air are known to occur in a non-reversible manner. Additional chemical reactions with oxygen from air have been known to occur in the reversible manner. However, most of these reversible interactions of chemical agents with oxygen are sufficient to recover only a relatively small percentage of the oxygen, or the recovery techniques are less than desirable for a commercial continuous operation. The use of alkali metal nitrites and nitrates in combination have been known to provide a viable alternative for the separation of oxygen from air in a reversible chemical reaction.

In U.S. Pat. No. 4,132,766, a process for the separation of oxygen from air in a regenerative chemical process is set forth. Air is contacted with a molten alkali metal salt, which constitutes an oxygen acceptor. The oxidized oxygen acceptor is removed and reduced in pressure to regenerate free oxygen from the acceptor. The regenerated acceptor can then be recycled for further renewed oxidation. The patent discloses a single absorption zone and a single connected desorption zone.

In U.S. Pat. No. 4,287,170, a process is set forth for the recovery of nitrogen and oxygen separately from air. The process utilizes a first absorption and desorption cycle in which oxygen oxidizes a molten alkali metal salt mixture, and the salt mixture is subsequently depressurized to drive off the recovered oxygen. The effluent from the absorption zone, which contains residual oxygen, is then passed to a second absorption zone in which residual oxygen is removed by contact with a scavenger, such as manganese oxide. The effluent from this absorption zone constitutes a commerically pure nitrogen product. The oxidized scavenger is reduced by contact with a reducing gas, which produces an exhaust effluent containing residual oxygen and reducing gas in a mixture as a by-product of impure composition.

U.S. Pat. No. 4,340,578 discloses another process for the separation of air into oxygen in an oxygen-depleted stream, wherein air is compressed, heated and contacted with an alkali metal salt mixture to oxidize the salt mixture and produce an oxygen-depleted effluent stream. The oxidized salt mixture is then depressurized in a desorption zone to recover an oxygen product. The regenerated salt mixture is recycled to the absorber or contact zone. The effluent from the absorption zone, which constitutes oxygen-depleted gas is then combusted with fuel and expanded and heat exchanged against process streams in order to provide the necessary heat for the reactions and the necessary power for the compression of feed air and product oxygen. The patent indicates that multiple stages of absorption and desorption are contemplated, but the exact flow scheme for such stages of absorption and desorption are not set forth.

U.S. Pat. No. 4,526,775 sets forth an absorptive separation using a molten bath of alkali metal nitrate and nitrite components to separate oxygen from air and to produce a by-product nitrogen stream, wherein the feed air is passed through at least three stages of absorption and the oxidized alkali metal nitrate is then separately cycled to a desorption zone from each of the stages of the absorption from air. After each desorption of oxygen from the alkali metal nitrate, the corresponding alkali metal nitrite is entirely recycled to its original absorption stage for further absorption. The patent contemplates that within the circuit of one absorption zone, a set of series desorption zones may be utilized, wherein all of the desorbing alkali metal nitrite is entirely sent to the next desorption zone before the entire alkali metal nitrite component is recycled to the individual absorption zone stage. That patent also identifies the prior art as being directed to a series of staged desorption zones coupled to a series of absorption zone stages, wherein there is no intermediate recycle or communication of the absorbent material.

The present invention provides an improved process for the recovery of oxygen from air using the molten alkali metal salt mixtures of the above prior art, wherein a similar recovery of high pressure oxygen is achieved as that of the prior art at reduced energy requirements.

BRIEF SUMMARY OF THE INVENTION

The present invention is directed to a continuous chemical process for separating oxygen from air in which elevated pressure air is contacted in an absorption zone with an oxygen acceptor which becomes oxidized, the oxidized oxygen acceptor is separately decomposed by at least one of the actions of pressure reduction or supplying heat in a desorption zone to yield an oxygen product and regenerated oxygen acceptor and the regenerated oxygen acceptor is recycled to the absorption zone, characterized in that said air is contacted in each of a plurality of series-connected stages of the absorption zone with at least a portion of freshly regenerated oxygen acceptor and the resulting oxidized oxygen acceptor from said absorption zone is regenerated in a plurality of series-connected stages of the desorption zone in which after each said stage of the desorption zone, only a portion of the regenerated oxygen acceptor is recycled to a corresponding stage of said plurality of series-connected stages of the absorption zone and the remaining regenerated oxygen acceptor is further regenerated in a subsequent stage of the desorption zone until the final stage of the desorption zone after which all of the regenerated oxygen acceptor from that stage is recycled to its corresponding stage of the absorption zone.

Preferably, the invention is directed to the above process where regneration is performed substantially by pressure reduction.

Preferably, the absorption zone and the desorption zone each comprise three series connected stages.

Specifically, the process of the present invention includes the partial regeneration of the oxidized oxygen acceptor with the evolution of oxygen gas in a first stage of desorption and the partially regenerated oxygen acceptor is split, with the first recycle stream returning to a first corresponding stage of the absorption zone and the first remaining stream further regenerated to a greater extent with the evolution of oxygen gas in a second stage of the desorption zone and further partially regenerated oxygen acceptor is split, with the second recycle stream returning to a second corresponding stage of the absorption zone and the second remaining stream further regenerated to a greater extent with the evolution of oxygen gas in a third stage of the desorption zone, wherein the regenerated oxygen acceptor is recycled to a third corresponding stage of the absorption zone.

Optimally, the process allows the recovery of oxygen at approximately 15 psia which constitutes approximately 25% of the oxygen in the feed air from the first stage of the desorption zone, oxygen is recovered at approximately 6 psia constituting approximately 45% of the oxygen in the feed air at the second stage of the desorption zone and oxygen is recovered at approximately 2.3 psia constituting approximately 20% of the oxygen feed air at the third stage of the desorption zone.

Preferably, the oxygen acceptor comprises a molten solution of alkali metal nitrite and nitrate wherein the anion composition includes 50–99.5% nitrate, 0.5–25% nitrite and 0.05–25% peroxides and superoxides and the cation composition includes sodium and potassium.

Preferably, the oxygen gas derived from the absorptive process constitutes commercially pure oxygen having a purity of at least 99.5% oxygen. Preferably, the nitrogen-enriched gas evolved from the absorptive process contains residual oxygen of less than 0.5%.

DETAILED DESCRIPTION OF THE DRAWINGS

DETAILED DESCRIPTION OF THE INVENTION

The present invention constitutes an improvement over the prior art related to the chemical separation of air using molten alkali metal salt. This prior art is represented by the above-cited U.S. Pat. No. 4,132,766, 4,287,170, 4,340,578 and 4,526,775, all of which are hereby incorporated by reference into the description of the present invention.

Absorptive processes for recovering oxygen from air using alkali metal salts require expensive compressors to maintain vacuum in the oxygen desorption portion of the process, when operated in a substantially pressure swing version. It is desirable to maximize the pressure level at which oxygen is recovered for any given level of pressure in the absorber in order to minimize the oxygen recompression power requirements and the capital costs of the process. Although high recoveries of high pressure oxygen have been achieved using completely independent absorption and desorption loops, such a process scheme results in higher total salt circulation rates, higher pump capacities and more power than are actually needed to achieve the recovery of high pressure oxygen, as will be exemplified in the description of the present invention.

The basic principle of the absorptive air separation process of the present invention comprises an oxygen acceptor, which is constituted by molten alkali nitrate and nitrite salt, which contacts free oxygen contained in a gas mixture, such as air, under conditions such that it undergoes reaction with part of the free oxygen, yielding a condensed phase oxidized oxygen acceptor. The condensed phase material is readily separated from the exhausting oxygen-depleted gas and is then caused to release its oxygen in relatively pure form by a decomposition reaction. The decomposition reaction is caused to occur by the action or step of reducing the pressure and/or supplying heat and may be aided by also supplying a stripping gas. Upon decomposition, the oxidized oxygen acceptor reverts to regenerated and reduced oxygen acceptor and the evolved gas, enriched in oxygen content, is collected. Then the cycle is repeated. The prior art discloses both batch and continuous processing modes for chemical air separation and both modes are applicable to this newly discovered process. Particularly high energy efficiencies are achieved when the respective oxidization and decomposition reactions are conducted in heat exchange relationship with one another, whereby the exothermic heat from the absorptive oxidation reaction supplies the bulk of the heat requirement of the endothermic desorptive decomposition reaction.

Preferably, the oxygen acceptor constitutes a composition which is liquid and remains liquid when reacted with air at process conditions, and which does not introduce undersirable impurities into the product oxygen. The invention consists of a process which takes advantage of the unique characteristics of the oxygen acceptor, thereby substantially reducing the amount of energy necessary to produce oxygen.

The oxygen acceptor is a molten mixture of alkali metal salts. The salt anion composition includes 50–99.5% nitrate, 0.5–25% nitrite and 0.05–25% combined peroxides and superoxides where percent signifies molar percent. The cation composition includes sodium and potassium in any proportions.

The process of the present invention, in contrast to the prior art, works by serially contacting successively more oxygen-depleted air with successively more deeply regenerated oxygen acceptor. Staged reduction in oxidized oxygen acceptor pressure in a series of desorption stages, combined with partial recycle of oxygen acceptor from each stage, allows much of the oxygen to be recovered at high pressure without resorting to multiple independent absorption and desorption cycle circuits. Comparison of the liquid absorbent flows of the proposed partial-recycle process of the present invention with those of the multiple independent recycle process approach of U.S. Pat. No. 4,526,775 at identical oxygen recoveries is shown in Table 1 below.

TABLE 1

| COMPARATIVE SYSTEMS | | |
|---|---|---|
| | Simulation Results | |
| | Present Invention | U.S. Pat. No. 4,526,775 |
| Air Feed, lb mole/hr | 100 | 100 |
| $O_2$ Product, % of $O_2$ in air | | |
| @ 15 psia | 25 | 25 |
| @ 6 psia | 45 | 45* |
| @ 2.3 psia | 20 | 20* |
| Total | 90 | 90* |
| Liquid Pumped, GPM: | | |
| Pump 32 | 82 | 177 |
| Pump 46 | 58 | 83 |
| Pump 60 | 37 | 31 |
| Total | 177 | 291 |

*The patent itself states 52% at 6 PSIA, 13% at 2.3 PSIA, 90% total. These values have been adjusted here for similar recoveries for comparison of flow rates.

Figure 2:
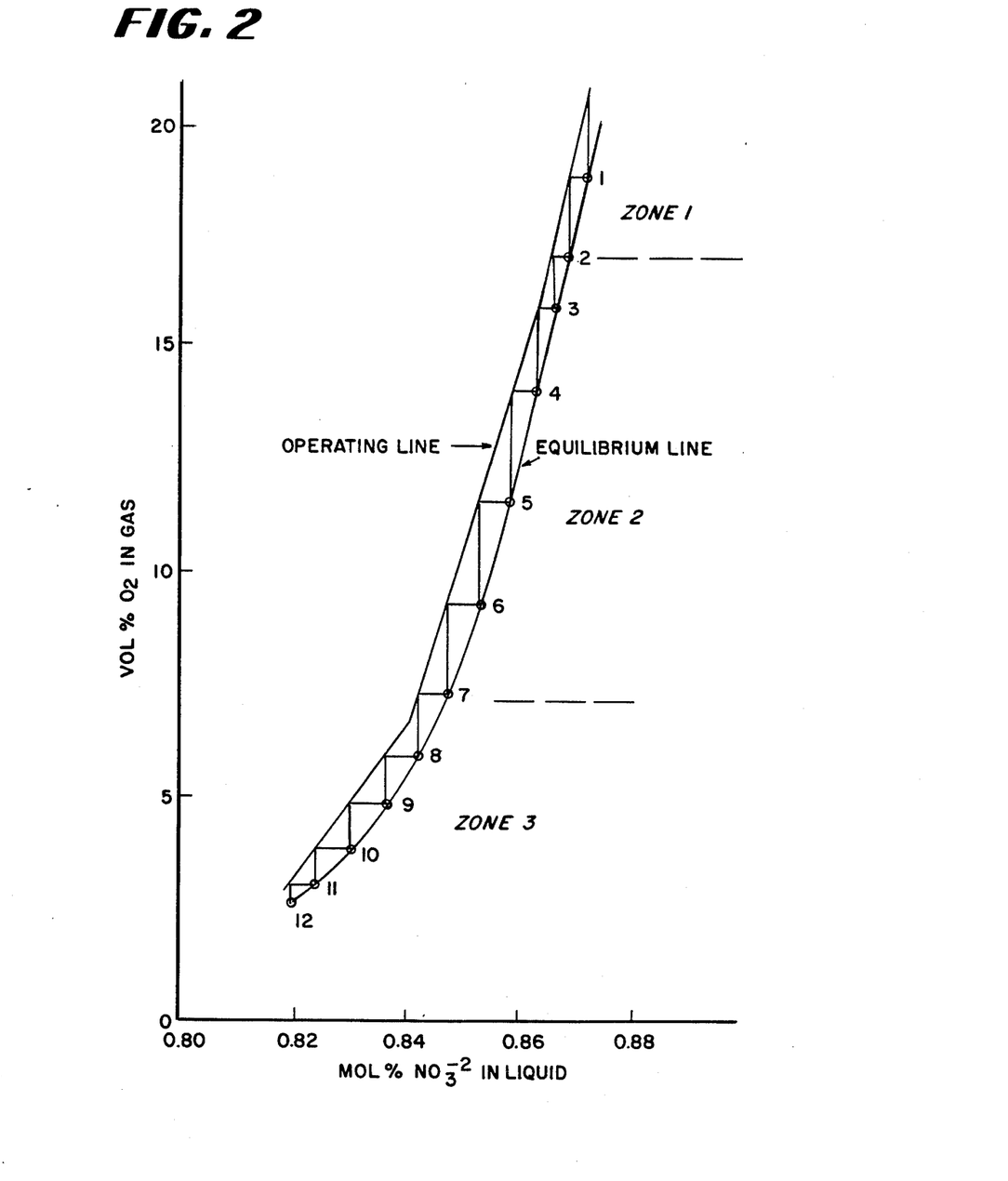
FIG. 2 constitutes a graph of the operating line and equilibrium line for the oxygen content in the gas being separated and the nitrate concentration in the absorbent liquid.
Figure 3:
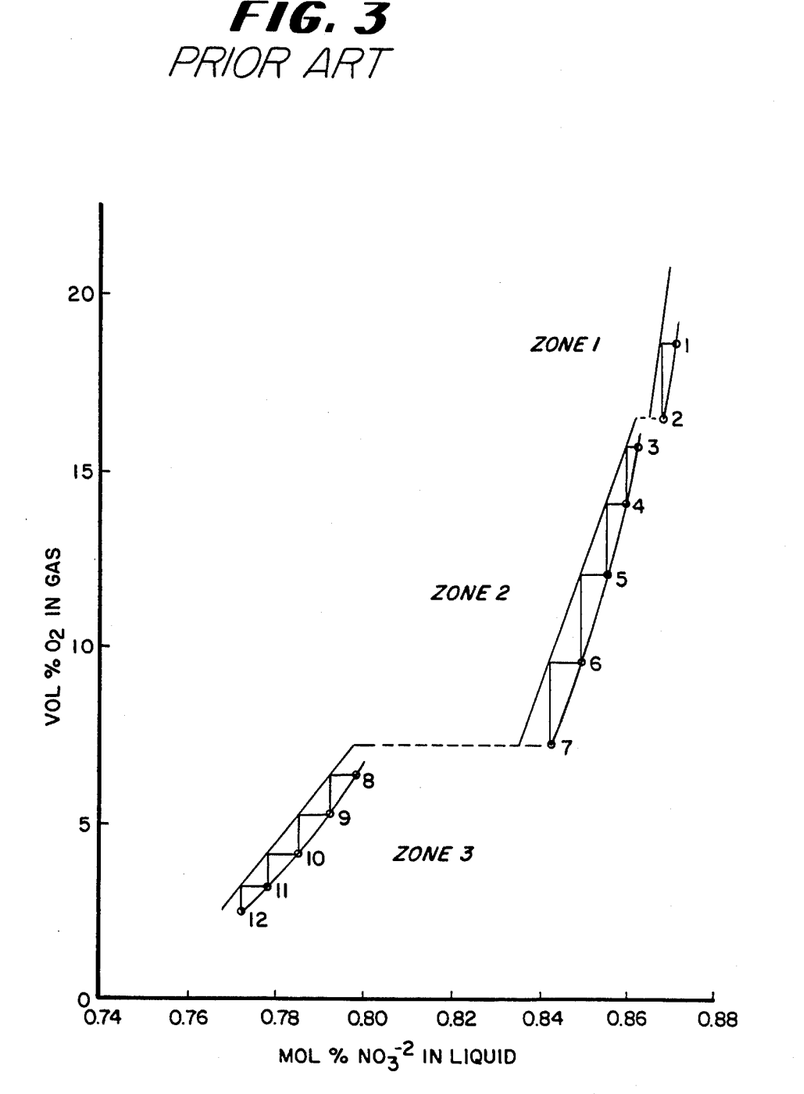
FIG. 3 constitutes a similar graph for the prior art of U.S. Pat. No. 4,526,775.

The staged absorption and desorption of the process of the present invention, with partial recycle after each desorption stage, allows a close match of the operating lines of the process to the strongly curved adiabatic equilibrium line that is characteristic of such process as set forth in FIG. 2 and FIG. 3. It should be noted that the equilibrium line is continuous in the process of the present invention, but can be discontinuous in the process of the prior art, such as U.S. Pat. 4,526,775, because each absorption zone of that patent operates independently of the other. The process of the present invention saves on pump power relative to the prior art, because the present process includes a recognition that the oxygen acceptor for each absorption stage can have a composition that is useful as absorbent feed to the next lower stage, thus eliminating the need for withdrawing the oxygen acceptor and replacing it with freshly regenerated acceptor between various stages. Close matching of the operating and equilibrium lines maximizes the oxygen loading in the absorbent leaving each of the stage absorption zones, and thereby maximizes the amount of oxygen which may be recovered at a given pressure in each of the stage desorption zones.

The present invention enjoys additional advantages over the prior art, such as U.S. Pat. No. 4,526,775, including;

(a) lower total absorbent circulation rate by up to 40% at the same recovery (the reduction of absorbent circulation rate proportionately reduces absorbent pump capacity and absorbent pump power, as well as the amount of dissolved nitrogen and argon in the absorbent. The reduction in such dissolved inerts improves the product purity of oxygen eventually evolved from the absorbent during the desorption in the various desorption stages);

(b) eliminating the need for collecting and withdrawing absorbent at intermediate points in the absorption zone between various stages of absorption;

(c) eliminating the need for separate temperature control systems for each of the three independent absorbent loops, which may require absorbent coolers in the upper loops of the process of U.S. Pat. No. 4,526,775; and (d) for a fixed absorption zone bottom temperature, the process of the present invention operates with substantially lower air inlet and nitrogen outlet temperatures than that of the prior art up to about 65° F. (this will result in smaller air to nitrogen and air to oxygen heat exchangers and in less absorbent vaporization from the absorption zone and from the low pressure desorption zone).

As can be seen in Table 1, the recovery of oxygen at the various pressures is approximately the same, but the required pump energy to achieve such recoveries is dramatically different and improved in the present invention in comparison to the prior art.

The recovery of oxygen and the purity of the nitrogen-enriched gas may be improved by increasing the pressure in the absorption zones. The effect of increased absorption zone pressure is illustrated in Table 2 below.

TABLE 2

| EFFECT OF ABSORPTION ZONE PRESSURE | | |
|---|---|---|
| | Simulation Results | |
| | Low Pressure | High Pressure |
| Air Feed, lb mole/hr | 100 | 100 |
| Pressure in Absorption Zone, psia | 100 | 500 |
| $O_2$ Product, % of $O_2$ in air | | |
| @ 15 psia | 25 | 32.6 |
| @ 6 psia | 45 | 45.3 |
| @ 2.3 psia | 20 | 20.2 |
| Total | 90 | 98.1 |
| Liquid Pumped, GPM: | | |
| Pump 32 | 82 | 82 |
| Pump 46 | 58 | 58 |
| Pump 60 | 37 | 37 |
| Total | 177 | 177 |
| Oxygen Content of Nitrogen-Enriched Gas, % | 2.6 | 0.5 |

Table 3 below provides an example of the improvement in oxygen recovery and nitrogen purity which can be obtained by optionally supplying heat to the first desorption zone and removing an essentially identical amount of heat following the final desorption zone.

TABLE 3

| EFFECT OF HEAT INPUT AND REJECTION | | |
|---|---|---|
| | Simulation Results | |
| | No Heat Input | Heat Input and Rejection |
| Air Feed, lb mole/hr | 100 | 100 |
| Pressure in Absorption Zone, psia | 100 | 100 |
| Heat Input/Rejection, MBtu/hr | 0 | 900 |
| $O_2$ Product, % of $O_2$ in air | | |
| @ 15 psia | 25 | 31.2 |
| @ 6 psia | 45 | 46.4 |
| @ 2.3 psia | 20 | 20.7 |
| Total | 90 | 98.3 |
| Liquid Pumped, GPM: | | |
| Pump 32 | 82 | 82 |
| Pump 46 | 58 | 58 |
| Pump 60 | 37 | 37 |
| Total | 177 | 177 |
| Oxygen Content of Nitrogen-Enriched Gas, % | 2.6 | 0.5 |

With heat input and rejection, oxygen recovery is increased in each of the desorption zones. Oxygen recovery of 98.3% results in less than 0.5% oxygen in the nitrogen-enriched gas, while oxygen recovery of 90% results in 2.6% oxygen in the nitrogen-enriched gas.

Another alternative for increasing the purity of the nitrogen-rich gas is the use of a small portion, preferably less than 10%, of the nitrogen-enriched gas as a stripping gas in the final desorption zone. Table 4 illustrates the improvements in nitrogen-enriched gas purity which can be obtained by the addition of a stripping zone as a final desorption zone.

TABLE 4
EFFECT OF STRIPPING IN FINAL DESORPTION ZONE

| | Simulation Results | |
|---|---|---|
| | No Stripping | Stripping Gas |
| Air Feed, lb mole/hr | 100 | 100 |
| Pressure in Absorption Zone, psia | 100 | 100 |
| Heat Input/Rejection, Btu/hr | 0 | 0 |
| Nitrogen-Enriched Gas to Stripping Zone, lb mole/hr | 0 | 1.8 |
| $O_2$ Product, % of $O_2$ in air | | |
| @ 15 psia | 25 | 23 |
| @ 6 psia | 45 | 45 |
| @ 2.3 psia | 20 | 20 |
| Total | 90 | 88 |
| Gas Exiting Stripping Zone at 2.3 psia, lb mole/hr | 0 | 4.0 |
| Liquid Pumped, GPM: | | |
| Pump 32 | 82 | 82 |
| Pump 46 | 58 | 58 |
| Pump 60 | 37 | 26 |
| Pump 94 | — | 11 |
| Total | 177 | 177 |
| Oxygen Content of Nitrogen-Enriched Gas, % | 2.6 | 0.5 |

Figure 1:
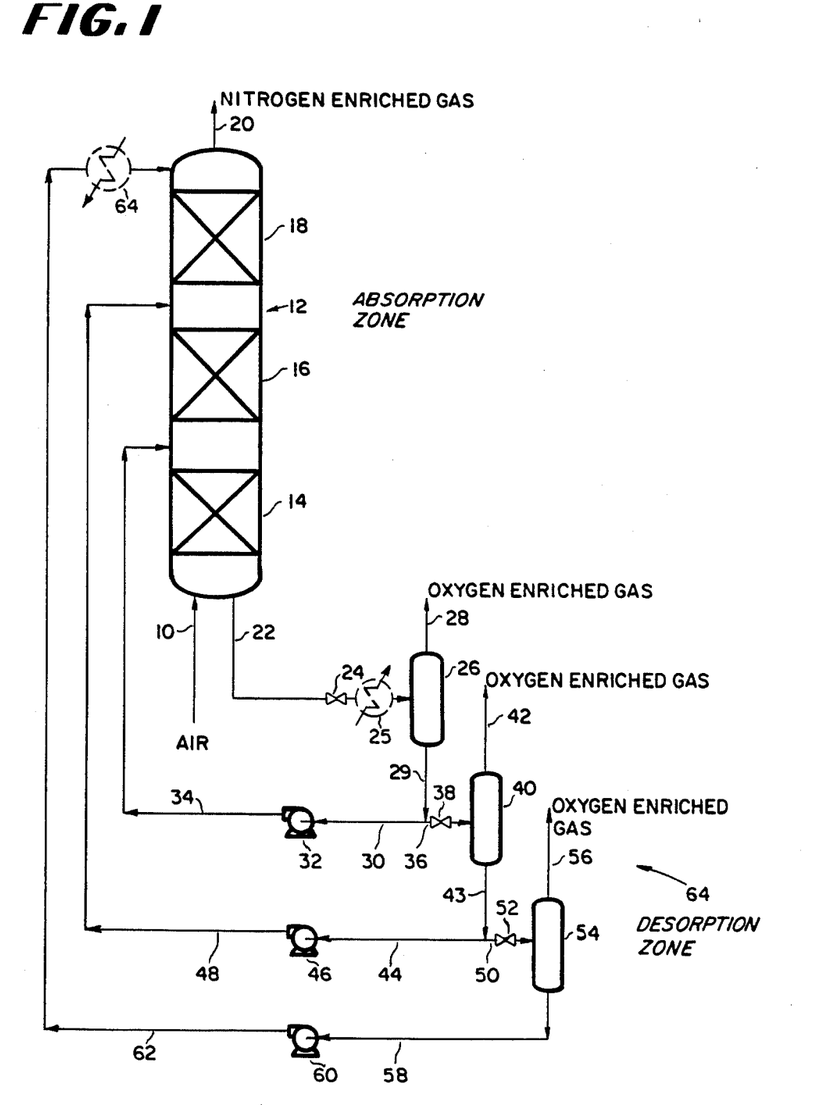
FIG. 1 constitutes a schematic flow scheme of a preferred embodiment of the present invention.

The present invention will now be described in greater detail with respect to a preferred embodiment. With reference to FIG. 1, air, which is previously pressurized, cleaned and heated to provide a 100 psia air feed in line 10, is introduced into the bottom of an absorption zone 12 constituting an absorption column with three absorption stages 14, 16 and 18. In each stage, the air is passed countercurrently to a molten salt solution of an oxygen acceptor, preferably an alkali metal salt of nitrite and nitrate. A nitrogen-enriched effluent gas stream is removed from the absorption zone 12 in line 20. Preferably, this effluent stream would be commercially pure nitrogen. The initial air feed passing through absorption stage 14 is contacted with a mixture of fresh or regenerated oxygen acceptor from line 34 originating from corresponding desorption stage 26 and partially oxidized oxygen acceptor from absorption stage 16 and 18. The oxygen acceptor is oxidized in the course of removing oxygen from the feed air stream. The partially oxygen-depleted feed air stream then passes to the subsequent absorption stage 16.

The initially oxygen-depleted air stream, still containing residual oxygen from the absorption stage 14, is then contacted in absorption stage 16 with a second mixture of fresh or regenerated oxygen acceptor from line 48, which is regenerated to a greater extent than the acceptor in line 34 and which originates from corresponding desorption stage 40, and by partially oxidized oxygen acceptor from absorption stage 18. Additional oxygen is removed from the partially oxygen depleted air stream and the oxygen acceptor is further oxidized by this removal step. The oxidized oxygen acceptor from absorption stage 16 is passed to absorption stage 14 for further oxidation as previously described. The further oxygen-depleted air steam from absorption stage 16 then contacts additional fresh or fully regenerated oxygen acceptor from line 62 originating from corresponding desorption stage 54 in the third and last absorption stage 18, wherein the air stream is further depleted of oxygen by the oxidation of the oxygen acceptor in the countercurrent flow of these two components. A commercially pure nitrogen is preferably removed from this final stage 18 of the absorption zone 12 and is recovered as a product in line 20. The oxidized oxygen acceptor from absorption stage 18 is passed to absorption stage 16 for further oxidation as previously described.

The fully oxidized oxygen acceptor is removed in line 22 and reduced in pressure rapidly through valve 24 before being introduced into a desorption stage of the desorption zone constituting desorber vessel 26. Optionally, heat may be supplied through heat exchanger 25. Alternatively, heat exchange may precede pressure reduction. Under the reduced pressure, a portion of the oxygen is released from the oxygen acceptor and exits the vessel 26 in overhead line 28. This constitutes high purity, high pressure oxygen product. Preferably it would be available at 15 psia, given a 100 psia air feed, and would constitute 25% of the oxygen in the air being treated. The reduced oxygen acceptor in its regenerated condition is removed in line 29. Only a portion of the flow in line 29 is removed in line 30 and returned at elevated pressure to the absorption zone 12 to the corresponding initial absorption stage 14 by means of pump 32 and line 34. Preferably, the portion returned is between 40 and 50% of the flow in line 29. The remaining flow of regenerated oxygen acceptor, in line 36, is reduced in pressure rapidly through valve 38. The oxygen acceptor is introduced into a second desorption stage comprising a desorber vessel 40 wherein additional bound oxygen is removed under the conditions of reduced pressure and exits the vessel 40 in overhead line 42. Preferably this oxygen would be recovered at 6 psia, for a 100 psia air feed, and would constitute 45% of the oxygen in the air treated. The oxygen acceptor, in its more deeply regenerated form, is removed as a bottom stream from vessel 40 in line 43. A portion of the regenerated oxygen acceptor in line 43 is recycled at elevated pressure through line 44, pump 46 and line 48 to the corresponding intermediate absorption stage 16 of the absorption zone 12. Preferably, the portion of the regenerated oxygen acceptor returned is between 55 and 65% of the oxygen acceptor in line 43. The remaining flow of regenerated oxygen acceptor, in line 50, is reduced in pressure rapidly through valve 52. The oxygen acceptor is introduced into a third desorption stage comprising a desorption vessel 54 wherein additional bound oxygen is removed under conditions of reduced pressure and exits the vessel 54 in overhead line 56. Preferably, this oxygen is recovered at 2.3 psia, for a feed stream delivered at 100 psia, and constitutes 20% of the oxygen in the air being treated by the overall system. The fully regenerated oxygen acceptor is removed in line 58 and is entirely recycled by pump 60 in line 62 to the absorption zone 12 for absorption duty in the corresponding final absorption stage 18. Optionally, heat may be removed through heat exchanger 64. The amount of heat removed through heat exchanger 64 would be substantially the same as that supplied through heat exchanger 25.

In this manner, only that amount of absorbent regeneration necessary to meet the equilibrium conditions in any individual stage of the absorption zone is performed. This is accomplished by recycling at least a portion of the partially regenerated absorbent from the various stages of the desorption zone, wherein the amount of recycle is dependent upon oxygen product evolved and the necessary extent of regeneration necessary for equilibrium conditions in the absorption zone. This refinement enhances the process by minimizing absorbent pumping and flow conditions and therefore minimizing capital costs in the apparatus necessary to perform the process.

Figure 4:
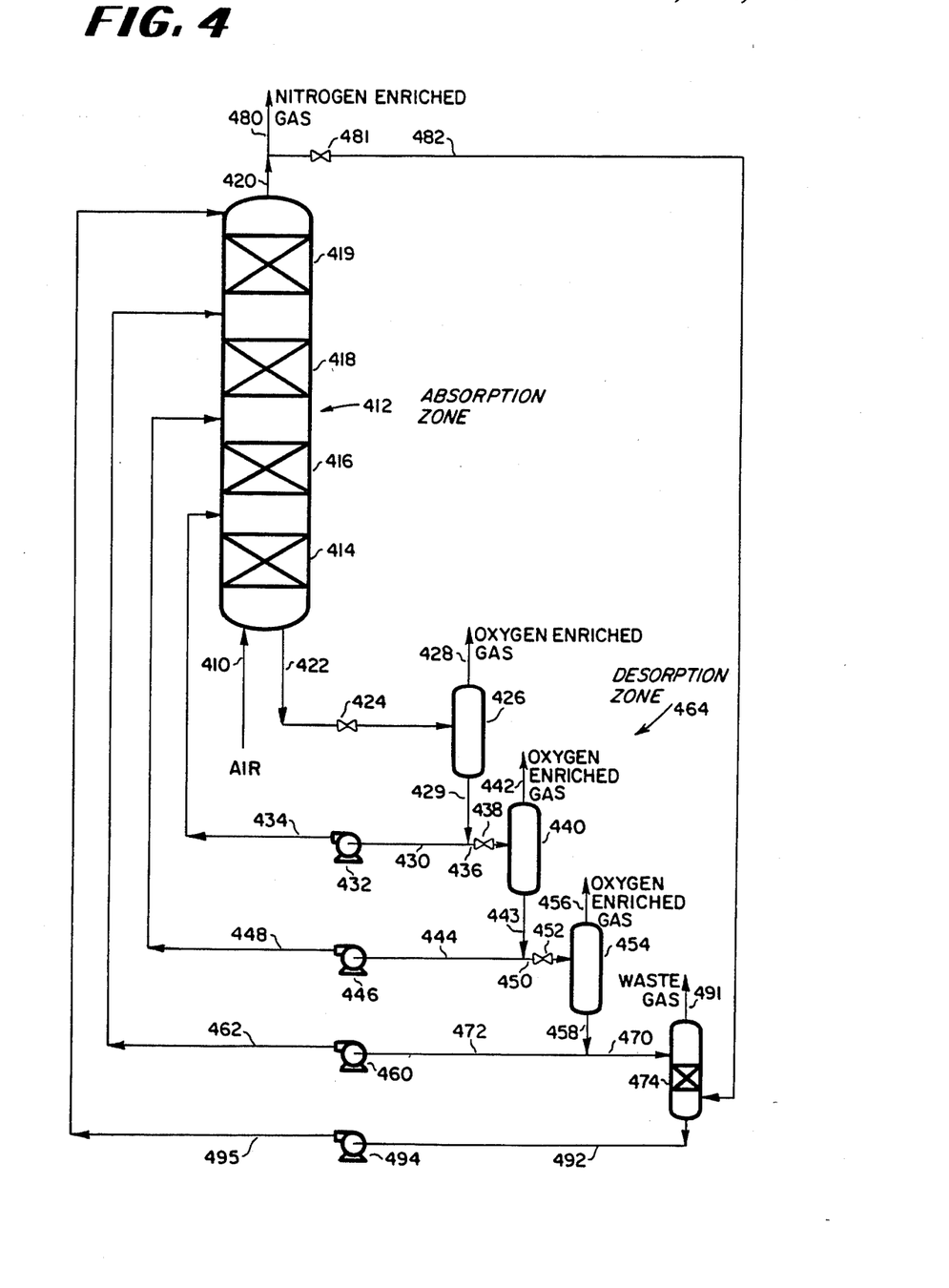
FIG. 4 constitutes an alternative schematic flow scheme of another embodiment of the present invention.

A second embodiment of the present invention will now be described with reference to FIG. 4. Air, which is previously pressurized, cleaned and heated to provide a 100 psia air feed in line 410, is introduced into the bottom of an absorption zone 412 constituting an absorption column with four absorption stages 414, 416, 418 and 419. In each stage, the air is passed countercurrently to a molten salt solution of an oxygen acceptor, preferably an alkali metal salt of nitrite and nitrate. A nitrogen-enriched effluent gas stream is removed from the absorption zone 412 in line 420. Preferably, this effluent stream would contain less than 0.5% residual oxygen. A portion of this effluent stream, preferably less than 5% and, more preferably, less than 2%, is reduced in pressure through valve 481 and conducted through line 482 for use as a stripping gas in desorption column 474. Alternatively, valve 481 may be replaced by an expansion turbine for recovery of power from the pressure reduction. The remaining nitrogen-enriched gas, constituting the majority of the effluent from absorption zone 419, is withdrawn as commercial product through line 480.

The initial air feed passing through absorption zone 414 is contacted with a mixture of fresh or regenerated oxygen acceptor from line 434 originating from corresponding desorption stage 426 and partially oxidized oxygen acceptor from absorption stages 416, 418 and 419. The oxygen acceptor is oxidized in the course of removing oxygen from the feed air stream. The partially oxygen-depleted feed air stream then passes to the subsequent absorption stage 416.

The initially oxygen-depleted air stream, still containing residual oxygen from the absorption stage 414, is then contacted in absorption stage 416 with a second mixture of fresh or regenerated oxygen acceptor from line 448, which is regenerated to a greater extent than the acceptor in line 434 and which originates from corresponding desorption stage 440, and by partially oxidized oxygen acceptor from absorption stages 418 and 419. Additional oxygen is removed from the partially oxygen-depleted air stream, and the oxygen acceptor is further oxidized by this removal step. The oxidized oxygen acceptor from absorption stage 416 is passed to absorption stage 414 for further oxidation, as previously described. The further oxygen-depleted air stream from absorption stage 416 then contacts additional fresh or regenerated oxygen acceptor from line 462 originating from corresponding desorption stage 454 in the third absorption stage 418, and by partially oxidized oxygen acceptor from absorption stage 419. Additional oxygen is removed from the partially oxygen-depleted air stream, and the oxygen acceptor is further oxidized by this removal step. The oxidized oxygen acceptor from absorption stage 416 is passed to absorption stage 416 for further oxidation as previously described. The further oxygen-depleted air stream from absorption stage 418 then contacts additional fresh or fully regenerated oxygen acceptor from line 495 originating from corresponding desorption stage 474 in the fourth and last absorption stage 419, wherein oxygen depleted air stream is further depleted of oxygen by the oxidation of the oxygen acceptor in the countercurrent flow of these two components. A commercially pure nitrogen, preferably containing less than 0.5% residual oxygen, is removed from this final stage 419 of the absorption zone 412. The oxidized oxygen acceptor from absorption stage 419 is passed to absorption stage 418 from further oxidation as previously described.

The fully oxidized oxygen acceptor is removed in line 422 and reduced in pressure rapidly through valve 424 before being introduced into a desorption stage of the desorption zone 464 consititutnig desorber vessel 426. Under the reduced pressure, a portion of the oxygen is released from the oxygen acceptor and exits the vessel 426 in overhead line 428. This consititutes high purity, high pressure oxygen product. Preferably, it would be available at 15 psia, given a 100 psia air feed, and would constitute 23% of the oxygen in the air being treated. The reduced oxygen acceptor, in its partially regenerated condition, is removed in line 429. Only a portion of the flow in line 429 is removed in line 430 and returned at elevated pressure to the absorption zone 412 to the corresponding initial absorption stage 414 by means of pump 432 and line 434. Preferably, the portion returned is between 40 and 50% of the flow in line 429. The remaining flow of oxygen acceptor, in line 436, is reduced in pressure rapidly through valve 438. The oxygen acceptor is introduced into a second desorption stage, comprising a desorber vessel 440, wherein additional bound oxygen is removed under conditions of reduced pressure and exits the vessel 440 in overhead line 442. Preferably, this oxygen would be recovered at 6 psia, for a 100 psia air feed, and would constitute 45% of the oxygen in the air treated. The oxygen acceptor, in its more deeply regenerated form, is removed as a bottom stream from vessel 440 in line 443. A portion of the further regenerated oxygen acceptor in line 443 is recycled at elevated pressure through line 444, pump 446, and line 448 to the corresponding second absorption stage 416 of the absorption zone 412. Preferably, the portion of the regenerated oxygen acceptor returned is between 55 and 65% of the oxygen acceptor in line 443. The remaining flow of the further regenerated oxygen acceptor, in line 450, is reduced in pressure rapidly through valve 452. The oxygen acceptor is introduced into a third desorption stage, comprising as desorption vessel 454, wherein additional bound oxygen is removed under conditions of reduced pressure and exits the vessel 454 in overhead line 456. Preferably, this oxygen is recovered at 2.3 psia, for a feed stream delivered at 100 psia, and constitutes 20% of the oxygen in the air being treated by the overall system. The oxygen acceptor, in its more deeply regenerated form, is removed as a bottom stream from vessel 454 in line 458. A portion of the more deeply regenerated oxygen acceptor in line 458 is recycled at elevated pressure through line 472, pump 460, and line 462 to the corresponding third absorption stage 418 of the absorption zone 412. Preferably, the portion of the regenerated oxygen acceptor returned is between 65 and 75% of the oxygen acceptor in line 458. The remaining flow of regenerated oxygen acceptor, in line 470, is passed without substantial reduction in pressure to a fourth desorption zone, comprising a desorption column 474, wherein additional bound oxygen is removed by countercurrent contact with nitrogen enriched stripping gas and exits this column 474 through overhead line 491. Preferably, this oxygen is recovered in admixture with nitrogen at a total pressure of 2.3 psia, for an air feed stream at 100 psia, and constitutes 10% of the oxygen in the air being treated in the overall system. The fully regenerated oxygen acceptor is removed in line 492 and is entirely recycled by pump 494 in line 495 to the absorption zone 412 for absorption duty in the corresponding final absorption stage 419.

In the manner described in this second embodiment of the present invention, the residual oxygen in the nitrogen enriched gas product is reduced significantly at the expense of very modest reductions in the rates of nitrogen enriched gas and oxygen enriched gas production.

The present invention has been set forth in detail in the preferred embodiment, but the scope of the invention should be ascertained from the claims which follow.

I claims:

1. In a continuous chemical process for separating oxygen from air in which elevated pressure air is contacted in an absorption zone with an oxygen acceptor which becomes oxidized, the oxidized oxygen acceptor is separately decomposed by at least one of the actions of pressure reduction or supplying heat or contacting with a stripping gas in a desorption zone to yield an oxygen product and regenerated oxygen acceptor and the regenerated oxygen acceptor is recycled to the absorption zone, characterized in that said air is contacted in each of a plurality of seriesconnected stages of the absorption zone with at least a portion of freshly regenerated oxygen acceptor and the resulting oxidized oxygen acceptor from said absorption zone is regenerated in a plurality of series-connected stages of the desorption zones in which after each said stage of the desorption zone only a portion of the regenerated oxygen acceptor is recycled to a corresponding stage of said plurality of series-connected stages of the absorption zone and the remaining regenerated oxygen acceptor is further regenerated in a subsequent stage of the desorption zone until the final stage of the desorption zone after which all of the regenerated oxygen acceptor from that stage is recycled to its corresponding stage of the absorption zone.

2. The process of claim 1 wherein the oxidized oxygen acceptor is regenerated by pressure reduction.

3. The process of claim 1 wherein the absorption zone comprises three series-connected stages and the desorption zone comprises three series-connected stages.

4. The process of claim 3 wherein the air passes through the three stages of the absorption zone, being depleted of oxygen to a greater extent in each ensuing stage by contact with at least a portion of the oxygen acceptor which portion of the oxygen acceptor has been regenerated to a greater extent in a respective stage of the desorption zone before its introduction into the respective ensuing stage of the absorption zone and the resulting oxidized oxygen acceptor from the absorption zone at least in part passes through the three stages of the desorption zone being regenerated to a greater extent in each ensuing stage of the desorption zone.

5. The process of claim 4 wherein the oxidized oxygen acceptor is partially regenerated with the evolution of oxygen gas in a first stage of the desorption zone and the partially regenerated oxygen acceptor is split with a first recycle stream returning to a first corresponding stage of the absorption zone and a first remaining stream further regenerated to a greater extent with the evolution of oxygen gas in a second stage of the desorption zone and the further partially regenerated oxygen acceptor is split with a second recycle stream returning to a second corresponding stage of the absorption zone and a second remaining stream further regenerated to a greater extent with the evolution of oxygen gas in a third stage of the desorption zone wherein the regenerated oxygen acceptor is entirely recycled to a third corresponding stage of the absorption zone.

6. The process of claim 5 wherein oxygen is recovered at approximately 15 psia constituting approximately 25% of the oxygen in the feed air at the first stage of the desorption zone, oxygen is recovered at approximately 6 psia constituting approximately 45% of the oxygen in the feed air at the second stage of the desorption zone, and oxygen is recovered at approximately 2.3 psia constituting approximately 20% of the oxygen in the feed air at the third stage of the desorption zone.

7. The process of claim 1 wherein the oxygen gas recovered from the desorption zone is commercially pure oxygen having a purity of at least 99.5% $O_2$.

8. The process of claim 1 wherein a commercially pure nitrogen gas having a purity of at least 99.5% $N_2$ is recovered from the desorption zone.

9. The process of claim 1 wherein the oxygen acceptor comprises a molten solution of alkali metal nitrite and alkali metal nitrate.

10. The process of claim 1 wherein the anion composition includes 50-99.5% nitrate, 0.5-25% nitrite, 0.05-25% peroxides and superoxides and the cation composition includes sodium and potassium.

* * * * *